Dec. 21, 1937.  K. L. BRIDGES  2,102,784
METHOD OF MAKING A WEAR INDICATING TIRE
Filed Feb. 6, 1936
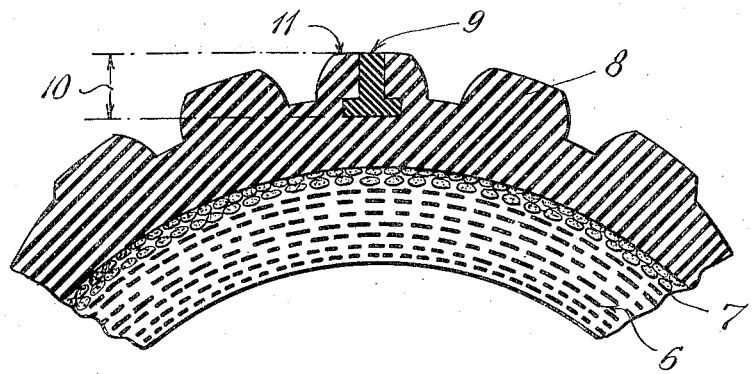
Fig. 1.
Fig. 2.
Fig. 3.
Fig. 4.
Fig. 5.
Kenneth L. Bridges
INVENTOR
BY
ATTORNEY Patented Dec. 21, 1937

2,102,784

UNITED STATES PATENT OFFICE 2,102,784

METHOD OF MAKING A WEAR INDICATING TIRE

Kenneth L. Bridges, New York, N. Y., assignor to Socony-Vacuum Oil Company, Incorporated, New York, N. Y., a corporation of New York Application February 6, 1936, Serial No. 62,717

3 Claims. (Cl. 18—59)

This invention is directed to the provision of a tire such as an automobile or truck tire in which there is a means of determining the extent to which the tire has been used.

In the sale of automobile tires, it is customary to guarantee the tire upon either of two bases. It may be guaranteed upon a time basis, or upon a mileage basis. Upon the time basis the guarantee usually is that the tire will give satisfactory service for a period of twelve months from the date of sale. This method of guarantee is unsatisfactory for both parties in that most drivers do not use a tire sufficiently in a period of twelve months to make the guarantee mean anything to them, and feel that it is costly to them, while some few drivers may drive a tire so much that it is actually used up before the expiration of this period, and the guarantee thereby works an injustice against the seller of the tire. Mileage guarantees are capable of being worked to the disadvantage of the seller and adjustments based on mileage almost invariably result in ill feeling. Many attempts have been made to incorporate into the structure of a tire some means whereby the amount of use which it has undergone when adjustment is proposed may be accurately estimated. Practically all of such suggestions so far made have not been successful for various reasons, some of which are hereafter pointed out. One common suggestion of this nature has been to incorporate into the tread material of the tire strips, or disks, or the like of foreign material, such as bits of fabric. These suggestions have been unsuccessful for several reasons. With respect to foreign material, a very pertinent reason is that foreign material being of a different physical character from the rubber of the tread by which it is surrounded will behave differently under the flexure of the tire when driving, giving rise to heat, mechanical abrasion, internal separation in the tire body, and the like, and in general so shorten the life of the tire. Another method which has been proposed is that of building up the tread of the tire with layers of rubber of different colors with the idea that when the tread had worn down to a certain color it would be possible to accurately estimate the mileage over which it had been used. This suggestion also is inherently doomed to failure, and the reason by which it is at fault also gives rise to inaccuracy in the use of inserts of the type previously discussed, consequently the following short discussion is pertinent to both.

In building tires a carcase of rubber and fabric is built up to which a breaker strip is applied, the breaker strip being of a heavier fabric construction, and then the tread is applied. The tread, as applied to the carcase, is merely a slab of rubber without the indentations or corrugations which appear in the finished tire. The carcase with tread attached is then placed in a mold and cured, and in the curing the tread is forced to take on the configuration of the mold, forming the indentations or corrugations which appear in the tread surface of the finished tire. In this operation, it will be seen that the rubber tread material flows within the mold during the period of curing and formation of the finished tire. Anything placed at some given position in the tread material, prior to curing, as for instance an insertion of a foreign material or a lamination of rubber of other color will be dislocated by this flow of the tread material during curing and it will therefore be impossible to predict accurately its final depth in the finished product. A difference of a few thousandths of an inch in such location in distance from the finished tread surface may well mean a difference of several thousands of miles in the distance which the tire must be driven to wear down to the tell-tale insert or lamination. For example, tires have been made in which a lamination of white rubber was inserted in the tread material and after curing these tires, they have been sectioned and examined and the distance of the white lamination from the finished tread surface has been found to vary so widely that estimates of the use which a tire has received, based on wear which exposed the white lamination at different locations within an inch or so of one another, might easily vary approximately 100%.

It is an object of this invention to provide a wear-indicating degree of use, or adjustment means incorporated in the tread of a tire which may be accurately located with respect to distance from the finished tread surface, thereby permitting of adjustment based upon a reasonably accurate estimate of the service which a tire has undergone. This invention is based upon the discovery that in the final operation of molding and curing a tire, the mold may contain certain projections which will give a recess in the tread surface, certain portions of which are accurately located with respect to distance from the finished tread surface, and that this aperture may later be filled with a composition of such a nature that it will not of itself promote more rapid wear of the tire at that point.

For a more detailed explanation of this invention, I now make reference to the drawing which is attached to and made a part of this specification. In this drawing, Figure 1 shows a cross-section of a tire through the point where the device of this invention is located, and Figures 2, 3, 4, and 5 show in greater detail the preferred type of tell-tale device or other forms of this device which may be used. In Figure 1, which shows a partial cross-section of a tire, showing only the tread portion, 6 denotes the tire carcase, 7 the breaker strip, and 8 the tread. In the tread at a point on the center line of the cross-section appears the tell-tale device 9. This tell-tale device in this particular instance is of white rubber, cylindrical in form and T-shaped in cross-section, inserted with its larger portion downward. The method of producing this effect is as follows: In the mold in which the tire is placed for curing, at the desired point upon the tread surface, there is located, attached to the mold and made of the same or similar material, a member which has the same dimensions as the tell-tale device 9. When the tire is cured and removed, there remains in the tread surface a cavity of a predetermined shape and size, the bottom of which is at a definite distance 10, from the finished tread surface 11, which distance is accurately predeterminable. Then a suitable tell-tale member 9 is placed in this aperture, filling it completely, the tell-tale being of a nature essentially the same as the tread material but contrasting in color, and being firmly bonded to the surrounding tread material. Several methods are available for the insertion of this tell-tale member 9. The simplest is to preform the member 9 of semicured or of cured stock, cement it firmly within the aperture, and if semicured, complete the curing in place by local heating. More preferably, the member 9 may be of uncured or semicured plastic nature, and in such case may be forced into the aperture or cavity, and cured therein by some appropriate method of local curing, as by a spot heater, heated needle, or the like. Also, the cavity forming member of the mold may be attached to a removable mold section, may be removed after the tire tread has been partially cured and flow of tread material has substantially ceased and the cavity or aperture may then be filled with semicured or other appropriate stock, the mold part minus the cavity-forming member replaced, and the curing completed. Other methods will suggest themselves to those skilled in the art. The essential requirements to be observed are that the material of tell-tale insert 9, in its final form, be sufficiently close in nature, physical properties, etc., to the tread material, and be sufficiently firmly bonded to the surrounding tread material so that its presence does not of itself set up a localized area of accelerated wear. When the operation is completed, there is in the tire itself, at a depth always definitely located with respect to the original tread surface, an indication of the amount of service to which a tire has been subjected, and from which rational methods of adjustment for failure from faulty construction before attainment of expected service can be predicated. The inserts may take several forms. In fact any convenient form can be used, but preferably those in which the end of the insert most removed from the tread surface is the largest in diameter. The presently preferred form is a combination of two cylinders having a T-shaped longitudinal cross-section, as shown in perspective in Figure 2, and in plan in Figure 3. Other forms which may be used are forms such as the truncated cone shown in Figure 4, or the mushroom style shown in Figure 5. In the case of the T-shaped cylindrical insert, I have found convenient dimensions to be ⅜" from tread surface to bottom of insert, 3/16" diameter for shank, 5/16" diameter for head and 1/16" thickness for head. The method of adjustment herein contemplated is not one of mileage, but rather one in which the tire should not fail for construction faults before it is worn below the bottom of the insert, and in case of such failure, full value or nearly full value adjustment is contemplated, and after wear below the inserts, structural failure will be adjusted upon a very much decreased basis.

In practice, I may use a number of these inserts distributed about the periphery of the tire on the center line of the cross-section thereof, but I prefer to use only one such insert, and in order that it may be located readily, I prefer to place it in some predetermined location with respect to the markings on the side of the tire, as for instance in the same cross-section plane as the first letter of the maker's brand, or opposite the center mark usually applied on the side of tires, or opposite the monogram.

I claim:

1. The method of providing a tire with an accurately located degree-of-wear indicator which comprises the following steps: forming a tire of finished shape and dimensions having in the tread surface one or more holes of accurately predetermined dimensions and location with respect to finished tread surface, filling said holes with a material similar in physical properties but contrasting in color to the tread stock, and firmly bonding said material to the surrounding tread stock.

2. The method of providing a tire with an accurately located degree-of-wear indicator which comprises the following steps: forming a tire of substantially finished shape and dimensions having in the tread surface one or more small cavities with accurately predetermined dimensional relation to the finished tread surface, filling said holes with a material similar in physical properties but contrasting in color to the tread stock, and treating said filling material to firmly bond it to the surrounding tread stock.

3. The method of providing a tire with an accurately located degree-of-wear indicator which comprises the following steps: forming a tire of substantially finished shape and dimensions having in the tread surface one or more small cavities of accurately predetermined depth from the finished tread surface, said cavities having a greater cross-sectional area at the bottom than at the tread surface, filling said holes with a material similar in physical properties but contrasting in color to the tread stock, and treating said filling material to firmly bond it to the surrounding tread stock.

KENNETH L. BRIDGES.